(12) United States Patent
Ratcliffe et al.

(10) Patent No.: US 10,906,448 B2
(45) Date of Patent: Feb. 2, 2021

(54) DUMPER VEHICLE

(71) Applicant: JC Bamford Excavators Limited, Uttoxeter (GB)

(72) Inventors: Simon J. Ratcliffe, Uttoxeter (GB); Christopher J. Streat, Uttoxeter (GB); Richard J. Brindle, Uttoxeter (GB)

(73) Assignee: JC Bamford Excavators Limited, Uttoxeter (GB)

( * ) Notice: Subject to any disclaimer, the term of this patent is extended or adjusted under 35 U.S.C. 154(b) by 105 days.

(21) Appl. No.: 16/044,263

(22) Filed: Jul. 24, 2018

(65) Prior Publication Data

US 2019/0031073 A1 Jan. 31, 2019

(30) Foreign Application Priority Data

Jul. 25, 2017 (GB) .................................. 1711991.8

(51) Int. Cl.
*B60P 1/28* (2006.01)
*B60P 1/34* (2006.01)

(52) U.S. Cl.
CPC ................ *B60P 1/28* (2013.01); *B60P 1/283* (2013.01); *B60P 1/34* (2013.01)

(58) Field of Classification Search
CPC .. B60P 1/28; B60P 1/283; B60P 1/286; B60P 1/16; B60P 1/04; B60P 1/26; B60P 3/423; B60P 1/02; B60P 1/045
USPC .... 298/17 r, 22 r, 2, 11, 17.8, 17 b, 22 p, 18, 298/19 r, 24, 23 r, 23 m; 414/809, 498, 414/408, 420, 422, 467, 812, 680, 642, 414/500, 537
See application file for complete search history.

(56) References Cited

U.S. PATENT DOCUMENTS

| | | | | |
|---|---|---|---|---|
| 2,432,472 A | * | 12/1947 | Hastings, Jr. .......... | B65G 65/00 298/11 |
| 4,068,891 A | * | 1/1978 | Herbst ..................... | B62B 3/08 298/22 P |

(Continued)

FOREIGN PATENT DOCUMENTS

| | | |
|---|---|---|
| DE | 1859922 U | 10/1962 |
| DE | 202014101150 U1 | 5/2014 |

(Continued)

OTHER PUBLICATIONS

U.S. Appl. No. 15/965,667, filed Apr. 27, 2018.

(Continued)

*Primary Examiner* — D Glenn Dayoan
*Assistant Examiner* — Sunsurraye Westbrook
(74) *Attorney, Agent, or Firm* — Marshall, Gerstein & Borun LLP (57) ABSTRACT

A dumper vehicle includes: a frame comprising a front end and a rear end; front and rear wheels mounted to the frame; an operator seat mounted to the frame; and an open topped container for carrying a load therein mounted to the frame between the front and rear wheels, wherein the container is moveable between a transport position for transporting a load and a discharge position for discharging of a load; wherein the container defines an upper extent thereof, and wherein said upper extent of the container decreases in height with respect to a lower extent of the wheels towards the front end of the frame, when the container is in the transport position.

20 Claims, 10 Drawing Sheets

(56) References Cited

U.S. PATENT DOCUMENTS

2003/0218374 A1* 11/2003 Kress ..................... B60G 3/01
                                                      298/22 P
2015/0375609 A1* 12/2015 Mirzaei .................. B60K 6/22
                                                      298/17 R

FOREIGN PATENT DOCUMENTS

| DE | 202016101740 U1 | 7/2016 |
|----|-----------------|--------|
| EP | 0460875 A1 | 12/1991 |
| EP | 0955226 A2 | 11/1999 |
| EP | 1213209 A2 | 6/2002 |
| JP | 9132066 | 5/1997 |
| JP | 10025898 | 1/1998 |
| NL | 296390 A | 5/1965 |

OTHER PUBLICATIONS

Search Report for GB Patent Application No. 1706859.4, dated Oct. 3, 2017.
Search Report for GB Patent Application No. 1711991.8, dated May 10, 2018.
Extended European Search Report in European Patent Application No. 18184926.6, dated Jan. 3, 2019.

* cited by examiner

DUMPER VEHICLE

FIELD OF THE INVENTION

The present invention relates to a dumper vehicle.

BACKGROUND OF THE INVENTION

Dumper vehicles, often referred to as "site dumpers" are manufactured in various different sizes to suit the needs of the application, ranging from those required for small building sites to those required for large scale construction projects. A common dumper vehicle used for small building sites typically has an operating capacity (i.e. fully loaded) in the range of 6-9 metric tons.

A major problem faced when using dumper vehicles of this size is that as the skip of the dumper vehicle is provided in front of an operator, the forwards visibility of the operator is impaired. Further, due to height restrictions when the dumper vehicles are loaded onto trucks for transport, the position of the operator cannot simply be raised in order to improve visibility over the skip. A further problem encountered by dumper vehicles is that of stability during maneuvering of the vehicle if the vehicle is not operated in accordance with the operator's manual, e.g. when travelling at excessive speed over uneven ground, braking or steering abruptly. Furthermore, when the vehicle is configured for the skip to slew or rotate (known as a "swivel tip" dumper vehicle), rotation of a heavy load may present further challenges to stability.

The present invention seeks to overcome or at least mitigate one or more problems associated with the prior art.

SUMMARY OF THE INVENTION

According to a first aspect of the invention there is provided a dumper vehicle comprising: a frame comprising a front end and a rear end; front and rear wheels mounted to the frame; an operator seat mounted to the frame; a lifting assembly mounted to the frame, wherein the lifting assembly comprises a platform; and an open topped container for carrying a load therein that is mounted to the platform, wherein the container is moveable between a transport position for transporting a load and a discharge position for discharging of a load; wherein the lifting assembly is configured for elevating the platform relative to the frame from a first position to a second position, and wherein the container is rotatably mounted to the platform.

In standard swivel tip dumper vehicles, the lifting assembly is rotationally mounted on the frame, typically via a slew ring. However, this arrangement limits the size of lifting mechanism that can be used on the vehicle, as the lifting mechanism needs to be mounted within the footprint of the slew ring.

Providing a lifting apparatus that is mounted to the vehicle frame, and rotationally mounting the container to a platform of the lifting apparatus advantageously overcomes this limitations, and provides are larger area for the lifting apparatus to be mounted, enabling the lifting apparatus to be connected to the frame over a larger area, resulting a more stable mounting of a container to the frame.

Elevation of the platform from the first position to the second position may also move the platform in a direction towards the front end of the frame.

Advantageously, the forward movement of the frame provides the container with increased clearance between the rear of the container and the chassis and/or the cab to reduce the possibility of a collision during slewing of the container. This increased clearance between container and cab removes the need to chamfer the rear corners of the skip in order to reduce the chance of collisions, and so enables a larger volume of the container to be maintained.

The mounting platform may be mounted to the frame via a parallel linkage.

The lifting assembly and the container may be configured such that the container cannot rotate with respect to the platform when the mounting platform is in the first position.

Advantageously, this prevents collision between the container and the cab when the container is in the lowered position.

The frame may further comprise a main chassis having the operator seat mounted thereto and an articulating front chassis having the container mounted thereto, wherein a lower extent of the front chassis may be arranged to be lower than a lower extent of the main chassis.

Advantageously, mounting the container on a front chassis that is lower than the chassis on which the operator is situated has been found to increase the visibility over the container of an operator sat in an operator seat. Furthermore, such an arrangement lowers the center of gravity of the dumper vehicle, which improves the overall stability of the vehicle both when the container is loaded and empty.

The operator seat may be rotatably mounted to the frame for adjusting the operator seat between a forwards position and a rearwards position for carrying out a reverse drive operation.

The mounting platform may be arranged to be substantially level with a lower extent of the main chassis.

The front chassis may be substantially non-linear.

The front chassis may comprise a front section and a rear section, wherein the rear section may have an upper surface substantially lower than the upper surface of the front section, e.g. at least 10 cm lower. The mounting platform may be substantially level with the upper surface of the front section of the front chassis.

Advantageously, this lowers the position of the container, which further improves both the stability of the vehicle and the visibility over the container of an operator.

The dumper vehicle may comprise a front axle for mounting the front wheels to the frame, and the front section may extend above the front axle.

The front section may mount to the front axle at a position substantially above the front axle.

The container may comprise a lower surface including a substantially flat lowermost portion. The flat lowermost portion may be substantially level with the upper surface of the front section of the front chassis.

Advantageously, providing a flat bottom surface increases the volume at the bottom of the container for receiving a load, which works to lower the center of gravity of the vehicle, thus improving the stability of the vehicle.

The flat lowermost portion of the container may be mounted to the platform.

The container may be mounted to the platform via a slew ring.

The flat lower portion may be interposed between the front and rear wheels.

Advantageously, this moves the center of gravity of the loaded machine to be positioned between the front and rear wheels (i.e. closer to longitudinal the center of the vehicle), which improves the stability of the vehicle.

The length of the flat lower portion in a forward-rearward direction may be at least 25% of the total length of the container in a forward-rearward direction.

Advantageously, increasing the size of the flat lower portion of the container further increases the volume at the bottom of the container for receiving a load, which works to lower the center of gravity of the vehicle, thus improving the stability of the vehicle.

The lower surface of the container may comprise a first substantially linear inclined surface extending upwardly away from the flat lowermost portion towards the front end of the frame.

Advantageously, providing a linear angled surface that extends forwardly (i.e. towards and over the front wheels) reduces the angle between the flat lower portion and the front wall of the container, which minimizes the amount of residual material after unloading.

The container may comprise a front edge, and the container may further comprise a chute at said front edge.

Advantageously, providing a chute at the front edge aids in the discharge of material from the container.

The container may define an internal volume, and a majority of said internal volume may be positioned behind a rear extent of the front wheels.

Advantageously, this moves the center of gravity of the loaded machine to be positioned between the front and rear wheels (i.e. closer to longitudinal the center of the vehicle), which improves the stability of the vehicle.

The center of gravity of the vehicle may be maintained rearward of a rear extent of the front wheels.

The container defines an upper extent thereof, and wherein said upper extent of the container may decrease in height with respect to a lower extent of the wheels towards the front end of the frame, when the container is in the transport position.

Advantageously, providing a dumper vehicle where the upper extent of a container decreases in height toward the front of the vehicle has been found to increase the visibility over the container of an operator sat in an operator seat.

An operator in the operator seat having a height of approximately 173 cm may have a line of sight angle over the container of at least 20° below the horizontal, when the skip is unladen.

An operator in the operator seat having a height of approximately 173 cm may have a line of sight angle over the container of at least 16° below the horizontal, when the skip is laden.

BRIEF DESCRIPTION OF THE DRAWINGS

Embodiments of the invention will now be described by way of example only with reference to the accompanying drawings, in which.

DETAILED DESCRIPTION OF EMBODIMENT(S)

Referring to FIGS. 1 to 10, there is illustrated a dumper vehicle 10 according to an embodiment of the present invention. The dumper vehicle 10 has a nominal laden capacity of 6 metric tons and a volume of heaped material (e.g. earth) of approximately 3.2 m3 and of flowable material (e.g. concrete) of approximately 1.6 m3. The vehicle 10 includes a structural chassis frame 12 having a front end 14 and a rear end 16. The frame 12 has two sets of wheels mounted to the frame, two front wheels 18 mounted proximate the front end 14 of the frame 12, and two rear wheels 20 mounted proximate the rear end 16 of the frame 12.

The frame 12 also has an operator seat mounted to the frame 12. The operator seat is located proximate to the rear wheels 20 along the longitudinal length of the frame 12. In the illustrated embodiment, the operator seat is provided within an operator cab 22. However, it will be appreciated that in alternative arrangements, an operator cab 22 may not be provided and a roll cage may be used instead. A prime mover is mounted to the rear of the cab 22 within a housing 23, where the housing 23 forms the rear extent of the dumper vehicle 10.

The operator seat is mounted to the frame 12 so as to be rotatably fixed thereto. However, in alternative arrangements, the operator seat may be rotatable with respect to the frame 12 so as to enable an operator to adjust the seat position from a forwards position (i.e. facing the front end 14 of the frame 12) to a rearwards position (i.e. facing the rear end 16 of the frame 12) for carrying out a reverse drive operation.

Figure 1:
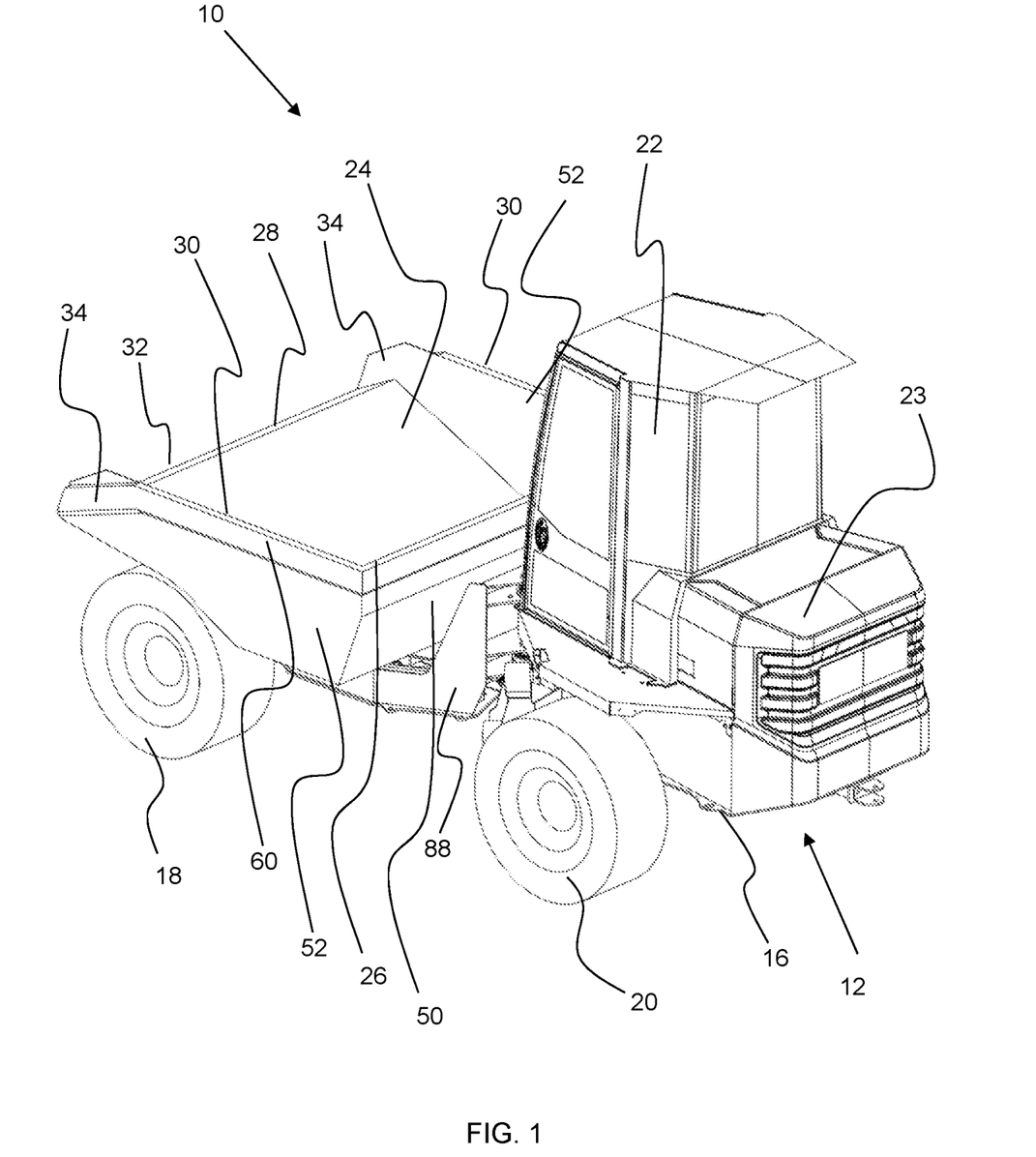
FIG. 1 is a rear isometric view of a dumper vehicle according to an aspect of the invention.
Figure 2:
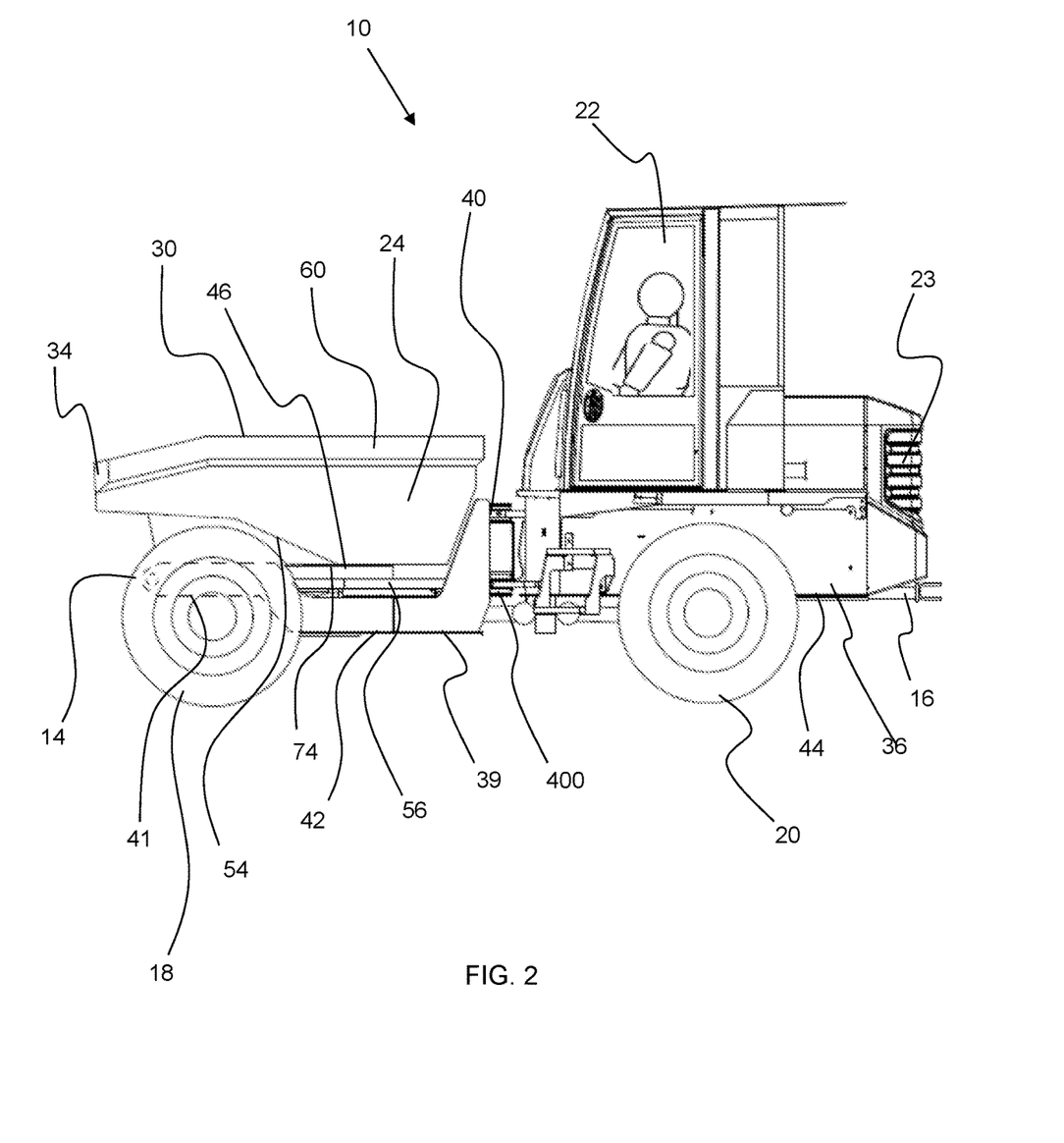
FIG. 2 is a side view of the dumper vehicle of FIG. 1.
Figure 3:
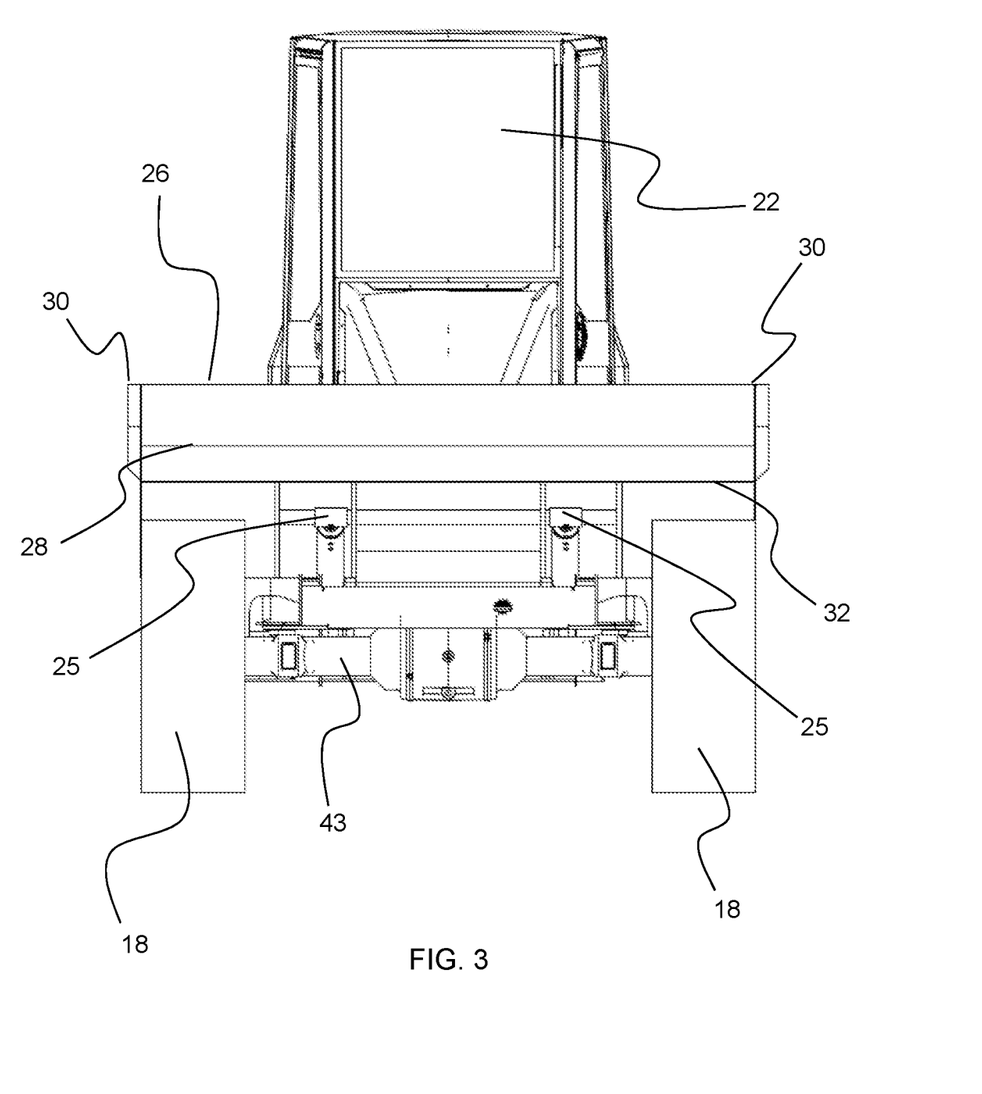
FIG. 3 is a front view of the dumper vehicle of FIG. 1.
Figure 4:
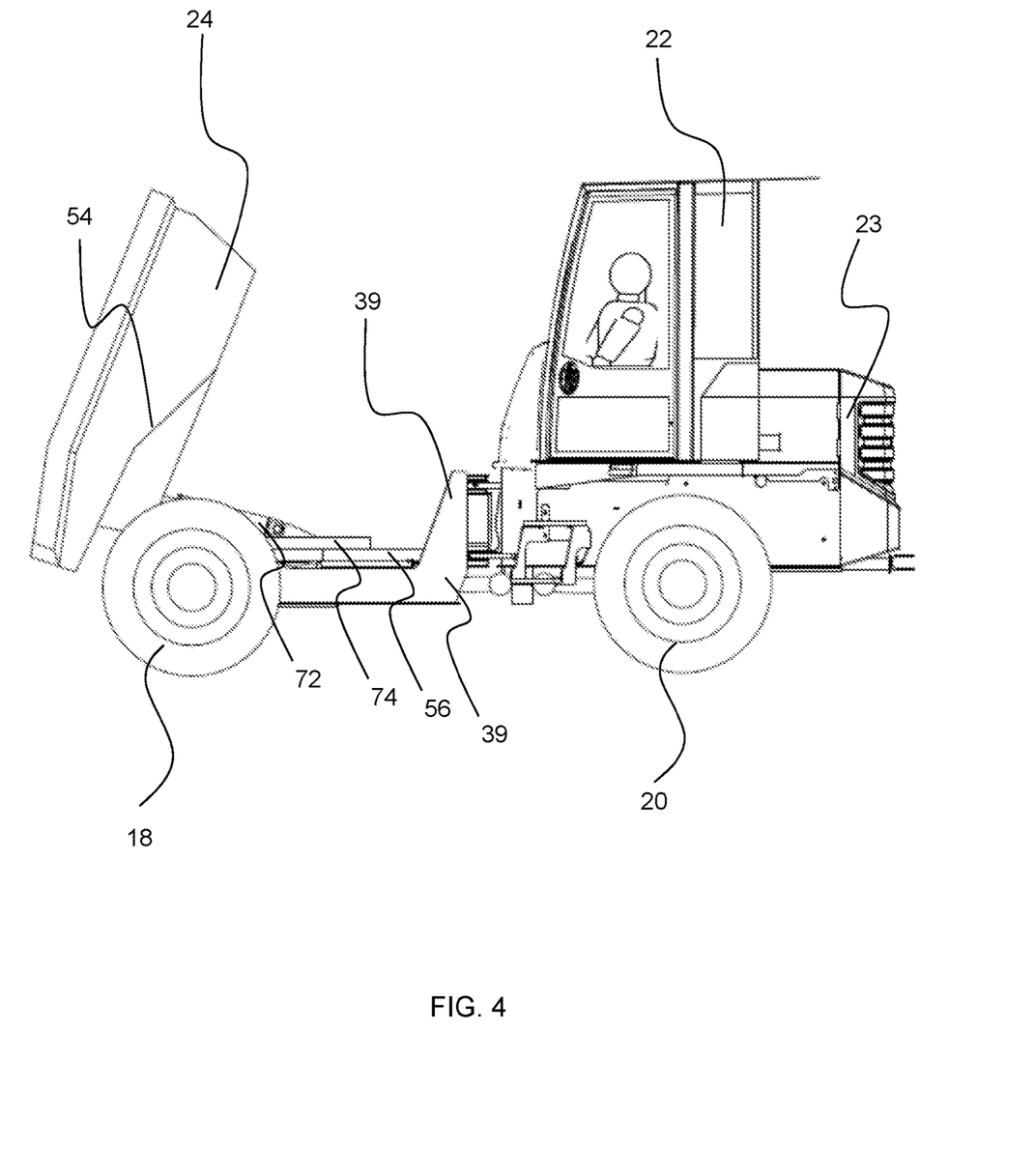
FIG. 4 is a side view of the dumper vehicle of FIG. 1 with a container thereof in a front discharge position.
Figure 5:
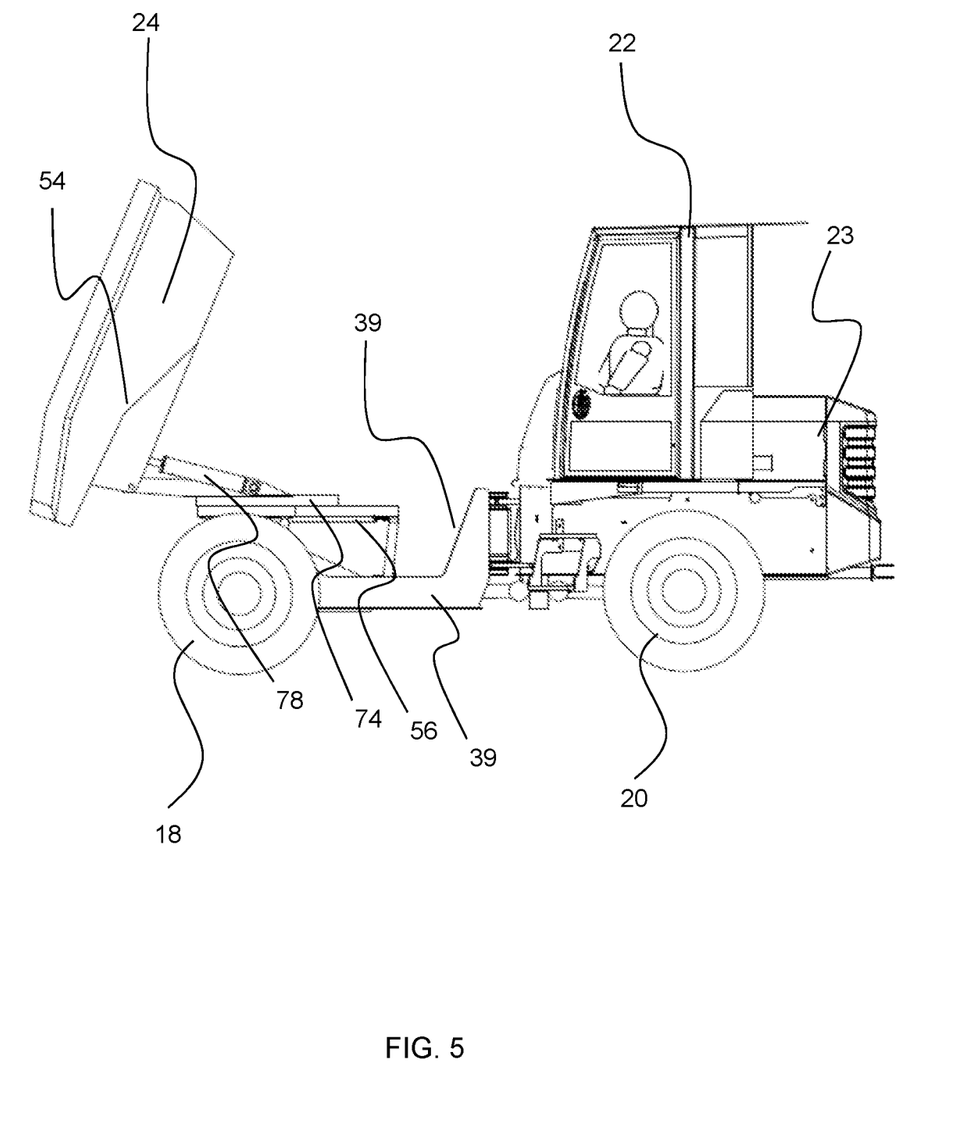
FIG. 5 is a side view of the dumper vehicle of FIG. 1 with a container thereof in an elevated front discharge position.
Figure 6:
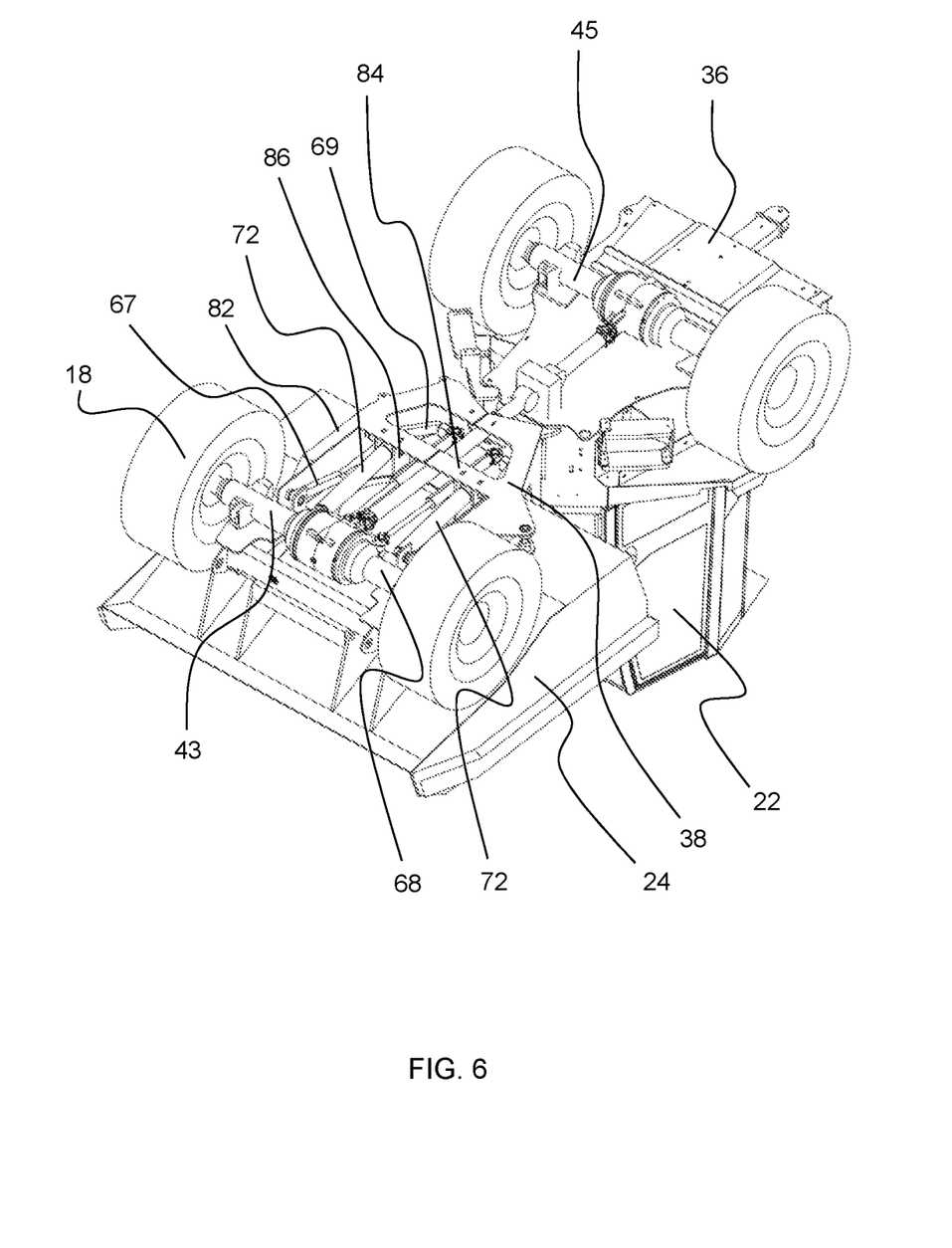
FIG. 6 is an underside isometric view of the dumper vehicle of FIG. 1.
Figure 7:
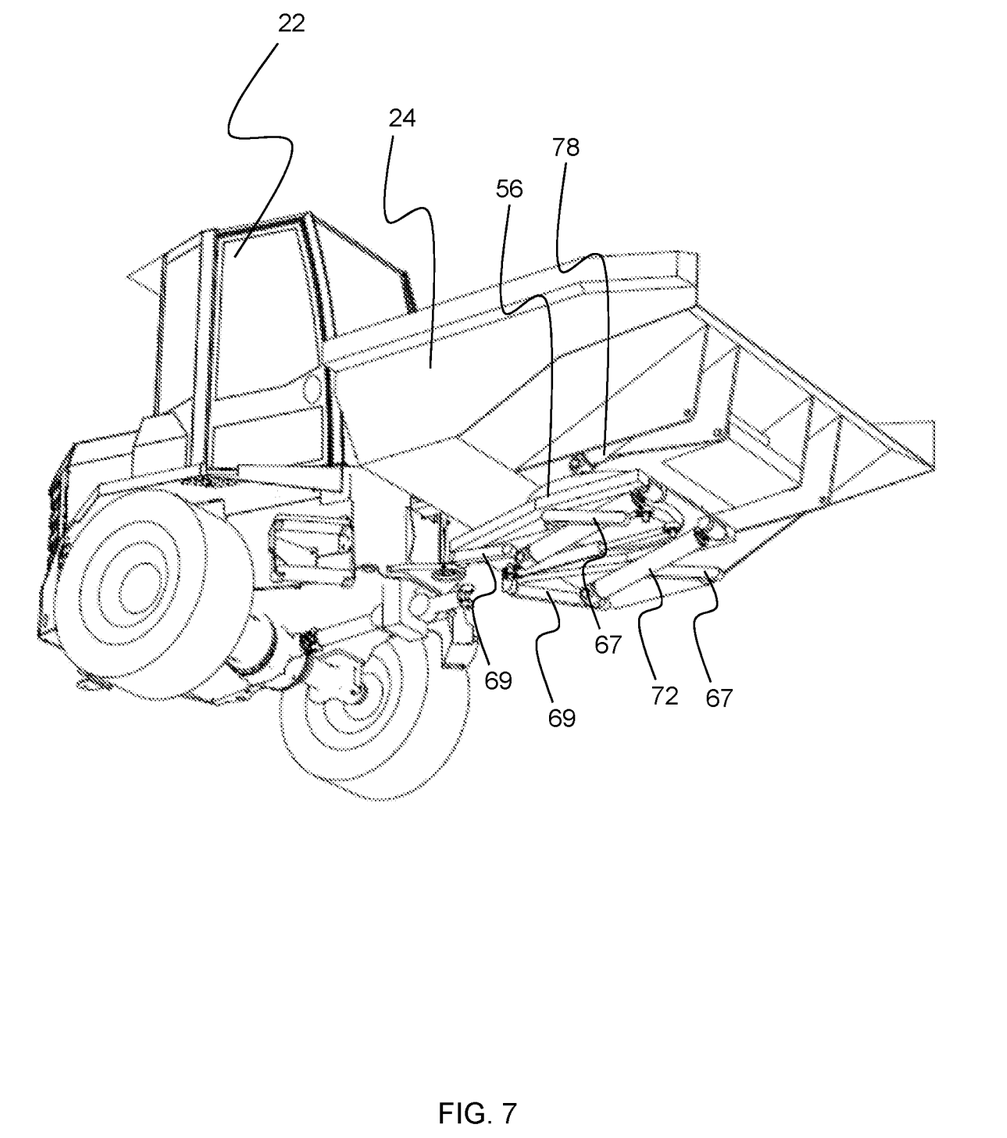
FIG. 7 is a front underside isometric view of the dumper vehicle of FIG. 1, with the front frame, front axle and front wheels removed for clarity.
Figure 8:
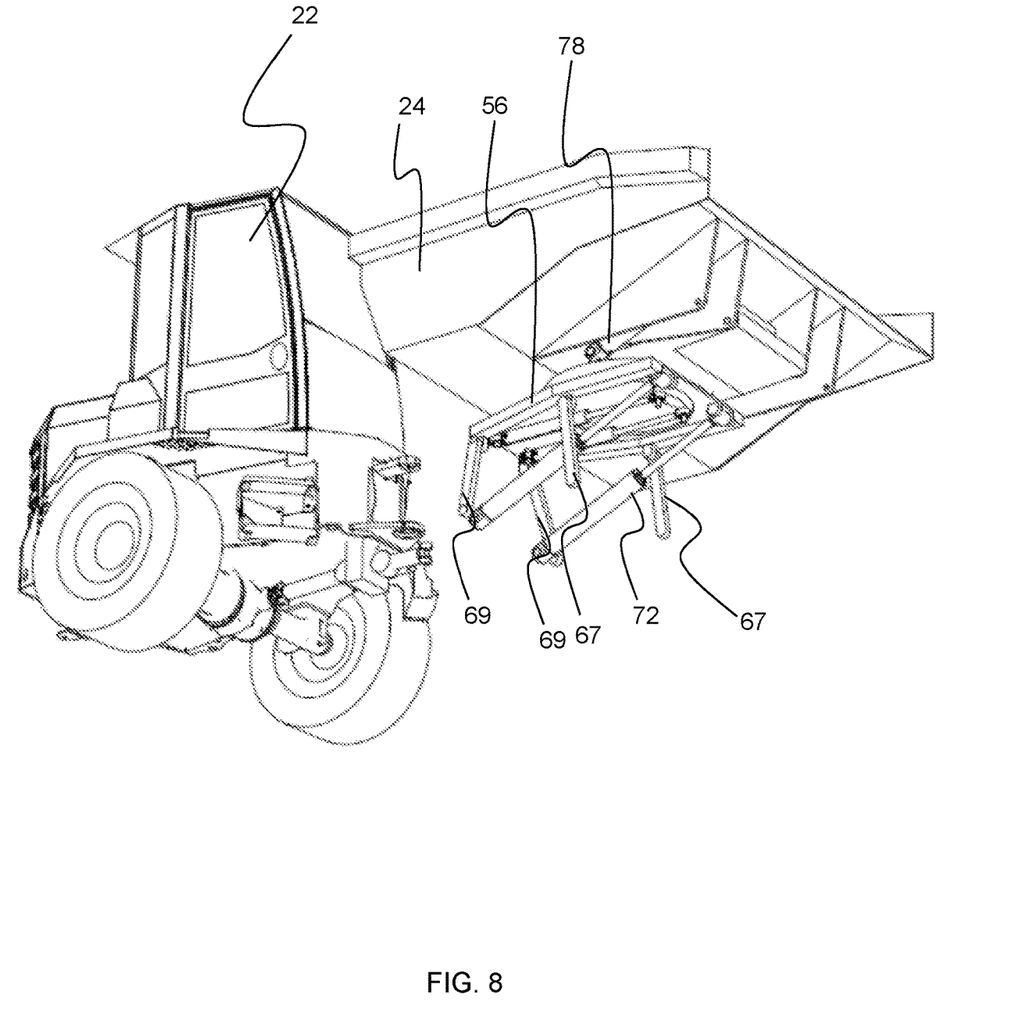
FIG. 8 is a front underside isometric view of the dumper vehicle of FIG. 7 with a container in an elevated position.

As is more clearly illustrated in FIG. 2, the frame 12 of the dumper vehicle 10 is provided in two parts that are able to articulate about at least a vertical axis with respect to each other. That is, the frame 12 includes a main rear chassis 36 and a front chassis 38. The length of the frame 12, and of the dumper vehicle 10 as a whole, has been extended by approximately 46 cm compared to known dumpers of comparable capacity (e.g. the present applicant's current swivel tip site dumper). The operator seat and operator cab 22 (or roll bar in alternative embodiments) are mounted to the main chassis 36. An open topped container 24, commonly referred to as a skip, is mounted to the front chassis 38 such that the container 24 is forward of the operator in the usual direction of movement. The main chassis 36 and the front chassis 38 are pivotally connected together via a linkage 40. The linkage 40 is such that the front chassis 38 is able to pivot or articulate about a vertical axis up to an angle of 35° with respect to the main chassis 36. This angle of articulation between the front chassis 38 and the main chassis 40 enables the dumper vehicle to maintain a similar turning circle for the extended frame length compared to a comparable known dumper vehicle.

The front chassis 38 is positioned to be at least in part lower than the main chassis 36. In the illustrated embodiment, a lower extent 42 of the front chassis 38 is positioned to be lower than a lower extent 44 of the main chassis 36 and as a result an upper surface of at least part of the front chassis is also lowered (as the front chassis is formed from chassis rails of similar vertical depth as along their length). This arrangement permits lowering of the container 24 with respect to an operator in the operator seat or cab 22, which increases the operator's visibility over the container 24. In the illustrated embodiment, the mounting platform 56 and the container 24 have been lowered by approximately 20 cm compared to known side tip dumper vehicles. Lowering of the container 24 and platform 56 also lowers the center of gravity of the dumper vehicle 10, which improves the overall stability of the vehicle, both when the container 24 is fully loaded and when it is empty, and both when container in the front tip and side tip positions.

The front chassis 38 is non-linear in side view (as is shown in FIG. 2). The front chassis 38 has a substantially flat rear section 39. The rear section 39 of the front chassis 38 is arranged to have an upper surface lower, e.g. 10 cm lower than the upper surface of the front section and be substantially lower than the lowermost extent of the main chassis 36. The platform 56 is mounted to the rear section 39 of the front chassis 38, thus mounting the container 24 onto the front chassis 38. The front chassis 38 further includes a front section 41 which extends upwardly and away from the rear section 39. The front section 41 is illustrated in broken lines on FIG. 2. The front chassis angles upwardly to a position above an axle 43 extending between the front wheels 18, and comprises a front section 41 that is substantially parallel to the rear part 39 of the front chassis 38. The front section 41, and so the front chassis 38, mounts to the front axle 43 at a position substantially above said front axle 43.

The container 24 is positioned such that a majority of the elongate length of the container 24 is situated between the front 18 and rear wheels 20. The container 24 defines an upper edge thereof. The upper edge of the container including a rear upper edge 26, a front upper edge 28 and two side upper edges 30 extending therebetween. The container 24 is further provided with a front lip 32 extending substantially away and downward from the front edge 28 of the container 24. A pair of opposing side walls 34 are provided at the opposing side edges of the front lip 32. The combination of the front lip 32 and the opposing side walls 34 forms a chute at the front of the container 24, i.e. extending from the front edge 28 of the container 24. Providing such a chute enables the flow of material to be better directed forwards away from the dumper vehicle 10 when it is being discharged from the container 24.

The dumper vehicle 10 includes a lifting assembly configured to elevate the container 24. The lifting assembly includes a mounting platform 56 that is mounted to the frame 12 via a linkage arrangement 66. The container 24 is mounted onto the platform 56, and the lifting assembly is configured to elevate the platform 56, and hence the container 24, relative to the frame, i.e. from a first position proximate to the frame to a second position that is remote from the frame. The elevation of the platform relative to the frame also works to move the platform and thus the container forward, i.e. in a direction towards the front end 14 of the frame 12. The container 24 is rotationally mounted onto the platform 56, so as to allow the container 24 to rotate with respect to the platform 56 by up to 90° left or right from the standard front tip position illustrated in FIG. 1.

This arrangement enables the mounting plate 56, and thus the container 24, to be supported on a portion 39 of the front chassis 38 that is substantially lower than the point of connection between an axle 43 and the front chassis 38. This allows for the lifting assembly to be accommodated without increasing the height of the upper edge of the container. Further, this arrangement does not reduce the overall ground clearance of the vehicle since the lower extent of the front axle 43 remains lower than the lower extent of the front chassis and is not significantly lower than the drive shaft 80 that transmits drive from the main chassis 36 to the front axle 43.

In the illustrated embodiment a lower extent of the platform 56 is positioned to be substantially level with the lower extent 44 of the main chassis 36. However, in alternative arrangements, it will be appreciated that the lowermost extent of the platform 56 may be positioned to be substantially below a lower extent 44 of the main chassis 36. This arrangement further improves both the stability of the vehicle 10 and the visibility over the container 24 of an operator. Additionally, lowering of the platform 56, and thus the lower extent 46 of the container 24 enables the height of the container to be maximized without significantly impairing on the visibility over the container 24 of an operator in the operator seat.

Arranging the container as described above has been found to result in a line of sight over the front of the container of the dumper vehicle for an operator having a height of 173 cm (a 50th percentile operator) when seated in the operator's seat in excess of 16° below the horizontal when the skip is laden with heaped material, where the heaped material has a slope in a 2:1 ratio of length to height, and in excess of 20° below the horizontal when the skip is unladen. This results in a significant reduction of the ground area around the dumper vehicle that is obscured by parts of the container (and a heap of material contained therein), which improves visibility for maneuvering the machine.

When mounted onto the frame 12 and in the transport position, the upper extent container 24 is substantially horizontal, which enables the capacity of the container 24 to be maximized. However, it will be appreciated that in alternative arrangements, the upper extent of the container may decrease in height towards the front end of the frame. That is, the side upper edges of the upper extent of the frame may decrease in height towards the front end of the frame. The upper extent of the container (i.e. the side upper edges thereof) may continuously decrease in height between a leading edge and a trailing edge of the container, such that the side edges of the container do not include any substantially level regions. This decreasing height works to increase the visibility over the container of an operator sat in an operator seat, whilst maximizing capacity.

Referring to FIGS. 6 to 10, the front chassis 38, lifting assembly and the slewing arrangement are illustrated in more detail. In the illustrated embodiment, the platform 56 is mounted to the front chassis 38 via a parallel linkage arrangement 66. The parallel linkage arrangement includes four arms, two front arms 67 and two rear arms 69. Each of the arms 67, 69 are pivotally mounted the frame 12 at a first end, and are pivotally connected to the platform 56 at a second end.

The front chassis 38 is in the form of a substantially U-shaped member having two opposing rails 82, each rail 82 having a front wheel 18 mounted to the distal end thereof. The front chassis 38 includes a cross beam 84 extending between the two opposing rails 82 of the U-shaped frame.

A first end of the each of the front arms 67 is mounted to the front chassis at opposing points on the U-shaped arms. A second end of the front arms 67 is then pivotally mounted to a forward region of the platform 56.

A first end of each of the pair of rear arms 69 is mounted to the cross beam 84 via a bracket 86. A second end of the rear arms 69 is then pivotally mounted to a rear region of the platform 56.

In order to drive the elevation of the platform 56, the lifting assembly is provided with a pair of actuators 72. The actuators 72 pivotally mounted between the frame 12 and the platform 56 so as to drive the container elevation from the lowered container position illustrated in FIG. 1 to the elevated position illustrated in FIG. 5.

A first end of the linear actuators 72 is mounted to the brackets 86. A second end of the actuators 72 is mounted to a forward region of the platform 56. This arrangement works so that, the parallel linkage arrangement, driven by the actuators 72, provides a simple way to both elevate the container 24 and simultaneously drive the container 24 towards a front end 14 of the frame 12. However, it will be appreciated that in alternative arrangements, different linkage mechanisms may be used in order to elevate and drive forward the platform 56 and container 24.

Figure 9:
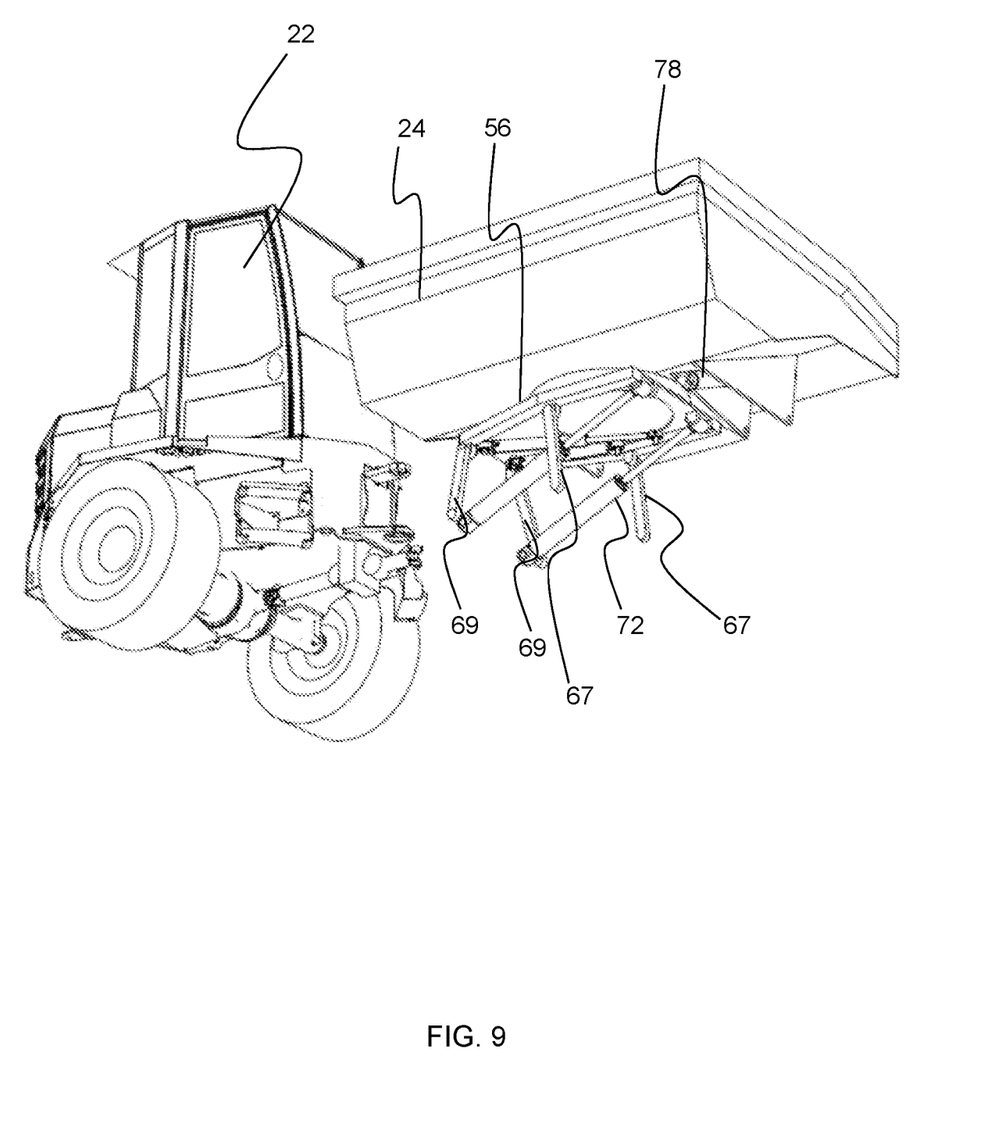
FIG. 9 is a front underside isometric view of the dumper vehicle of FIG. 7 with a container in an elevated and rotated position.
Figure 10:
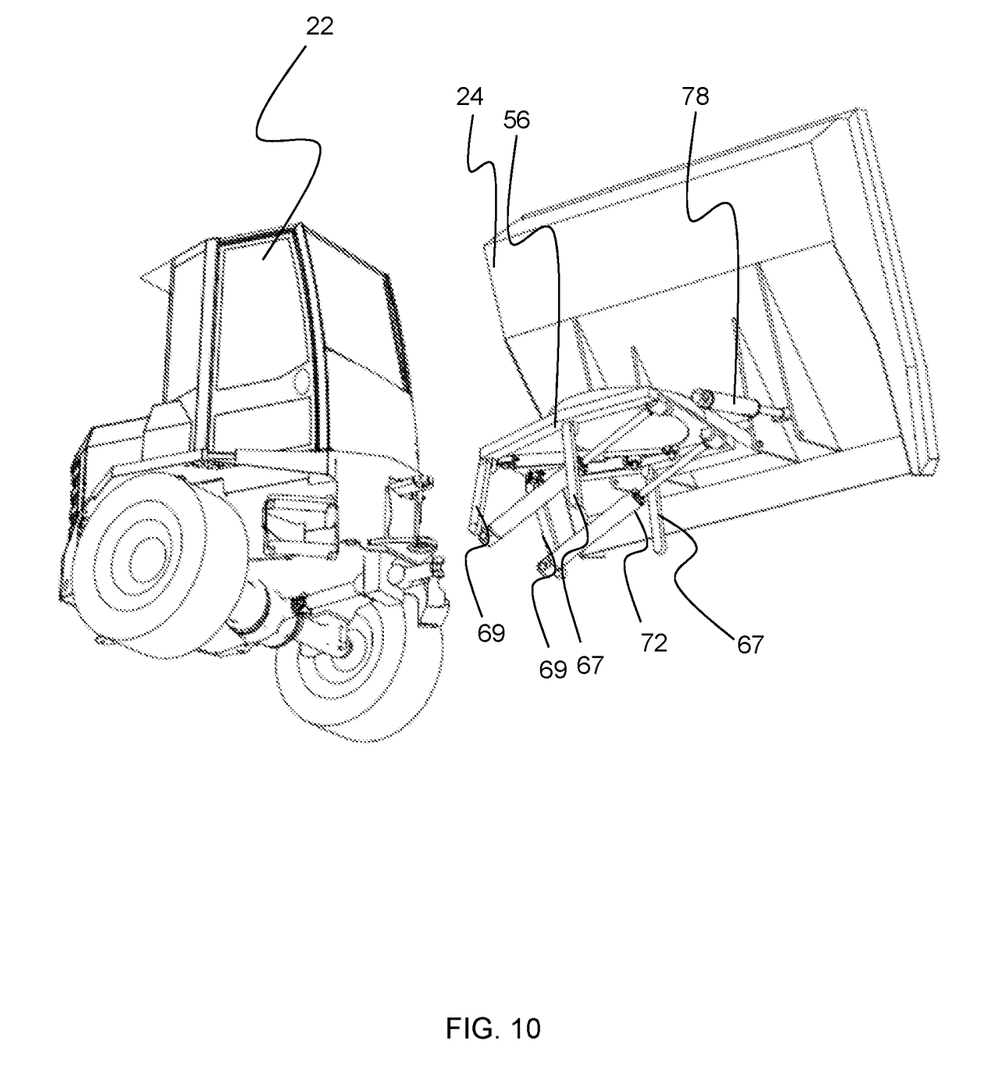
FIG. 10 is a front underside isometric view of the dumper vehicle of FIG. 7 with a container in an elevated side discharge position.

As discussed above, the container 24 is rotatably mounted to the platform 56. In FIGS. 1 to 8, the container 24 is illustrated as being in the straight ahead (i.e. front tip) position. In FIGS. 9 and 10, the container 24 is illustrated as being in the swivel tip position.

In the illustrated embodiment, the container 24 is mounted to the platform 56 via a rotatable connection, e.g. a slew ring 74. In order to drive the rotation, or slewing, of the container 24, e.g. in a substantially horizontal plane, the dumper vehicle 10 is provided with actuation means. In the illustrated embodiment, the actuation means is provided in the form of a pair of linear actuators 76. A first end of each of the actuators 76 is pivotally connected to the platform 56. A second end of each of the actuators 76 is pivotally mounted to the rotatable connection, i.e. the slew ring 74. The linear actuators 76 are pivotally connected to the slew ring 74 with one actuator 76 provided on each side of the rotational axis of the slew ring 74. It will be appreciated that in alternative arrangements, different actuation means and rotation arrangement may be used in order to slew the container.

In order for the container 24 to pivot between the transport position and a discharge position, the dumper vehicle 10 is provided a pair of hydraulic rams 78. The hydraulic rams 78 are mounted to the platform 56. The hydraulic rams 78 are pivotally mounted to the container 24 via two pivotable mounts 25. This arrangement enables the container 24 to be moveable or pivotable proximate the front of both the container 24 and the frame 12 between a transport position (e.g. FIGS. 1 and 2) for transporting a load and a discharge position (e.g. FIGS. 4 and 5) for discharging of a load. This arrangement enables the container to be moved into the discharge position when the container is both in the front tip position and also the side tip position.

The front chassis 38 includes an upstanding rear section 88 for mounting the articulating mechanisms thereto. The rear portion 88 is arranged to be positioned close to, or in contact with, the rear face of the container 24, when the container 24 is in the first lowered position. As such, any attempted rotation of the container 24 would result in the container 24 hitting the rear portion 88 of the chassis, causing damage to machine 10. Due to this, the lifting assembly and the container 24 are configured such that the container cannot rotate with respect to the platform 56, when the platform 56 is in the lowered or first position. This locking arrangement may be achieved by use of suitable sensors coupled with a hydraulic locking system.

The container 24 defines an internal volume for receiving a load therein. The majority of the internal volume of the container is positioned behind a rear extent of the front wheels 18 and in front of a forward extent of the rear wheels 20. This arrangement provides a more even weight distribution between front axle 43 and rear axle 45, i.e. a weight distribution that is close to 50:50 between front and rear axles, when the container 24 is loaded with material. Providing a more even weight distribution between the front and rear of the dumper vehicle 10 improves the stability and traction of the dumper vehicle 10.

The container 24 includes a lower surface 48, a rear surface 50 and two opposing side surfaces 52. The lower surface 48 of the container 24 includes a substantially flat lowermost portion, which defines the lowermost extent 46 of the container. The length of the flat lower portion 46 is at least 25% of the total length of the container in the direction between the front and rear ends of the frame 12. The substantially flat bottom surface 46 is positioned so as to be interposed between the front 18 and rear wheels 20.

The lower surface of the container 24 is situated lower than a typical dumper vehicle, which works to increase the storage capacity of the container at the bottom thereof, which works to lower the center of gravity of the vehicle. Lowering the center of gravity of the dumper vehicle 10 improves the stability of the vehicle 10. Positioning the flat lower surface to be interposed between the front and rear wheels positions the center of gravity of the machine closer to the actual center of the machine, which improves the stability of the vehicle.

In addition to the flat lower portion 46, the lower surface 48 of the container 24 further includes a substantially planar inclined surface 54 extending upwardly away from the lower flat portion 46, in a direction substantially towards the front edge 28 of the container 24. Providing this surface 54 as a substantially planar surface, rather than as a curved surface extending around the front wheel 18 works to reduce the incline between the flat lower surface 46 and the surface 54. Reducing this angle minimizes the amount of residual material in the container 24 after unloading.

The substantially planar inclined surface 54 extends upwardly away from the flat lower surface 46, such that a distal (forward) end of the inclined surface 54 forms the front edge 28 of the container 24. This planar inclined surface helps to increase the fluid storage capacity of the container, by raising the height of the front edge 28 of the container 24. Maximizing the fluid storage capacity is important for the transport of flowable materials, such a liquid concrete.

The container 24 further includes a reinforcing rib 60 extending around the rear edge 26 and two side edges 30 of the container. Although not illustrated, a first set of lifting eyes may be provided on the rear surface 50 of the container 24, proximate to the reinforcing rib 60. A second set of lifting eyes may also be provided along the side edges 30 of the container 24, proximate the front edge 28 of the container 24. Providing the lifting eyes enables the container 24 to be lifted from the dumper vehicle 10, when required.

Although the invention has been described above with reference to one or more preferred embodiments, it will be appreciated that various changes or modifications may be made without departing from the scope of the invention as defined in the appended claims.

Although the invention has been described above in terms of the frame being provided in two parts, it will be appreciated that the frame could be provided as a single component and the dumper vehicle could instead be steered by conventional Ackermann steering or otherwise. The region of the frame on which the container is mounted could be substantially lower than the region of the frame on which the operator's seat is mounted.

In an alternative skip arrangement, the substantially planar inclined surface may transition into a curved surface, which extends around an upper edge of the front wheels to a position substantially above the center of the front wheels. Curving around the upper edge of the front wheels helps to maximize the available volume within the container for receiving a load. The lower surface of the container may further include a second planar inclined surface extending upwardly and forwardly away from the curved surface. The distal end of the second inclined surface may form the front edge of the container. The second inclined surface may be substantially parallel to, but offset from, the inclined surface 54.

The invention claimed is:

1. A dumper vehicle comprising:
   a frame comprising a front end and a rear end;
   front and rear wheels mounted to the frame;
   an operator seat mounted to the frame;
   a lifting assembly mounted to the frame, wherein the lifting assembly comprises a platform; and
   an open topped container for carrying a load therein that is pivotally mounted to the platform, wherein the container is pivotable about a first axis between a transport position for transporting a load and a discharge position for discharging of a load, the first axis being a substantially horizontal axis;
   wherein the lifting assembly is configured for elevating the platform relative to the frame from a first position to a second position, and wherein the container is rotatably mounted to the platform such that the container is able to slew relative to the platform about a second axis.

2. A dumper vehicle according to claim 1, wherein elevation of the platform from the first position to the second position moves the platform in a direction towards the front end of the frame.

3. A dumper vehicle according to claim 2, wherein the mounting platform is mounted to the frame via a parallel linkage.

4. A dumper vehicle according to claim 1, wherein the lifting assembly and the container are configured such that the container cannot rotate with respect to the platform, when the mounting platform is in the first position.

5. A dumper vehicle according to claim 1, wherein the frame comprises a main chassis having the operator seat mounted thereto and an articulating front chassis having the container mounted thereto, further wherein a lowermost extent of the front chassis is arranged to be lower than a lowermost extent of the main chassis.

6. A dumper vehicle according to claim 1, wherein the front chassis is substantially non-linear in side view.

7. A dumper vehicle according to claim 6, wherein the front chassis comprises a front section and a rear section, further wherein the rear section has an upper surface substantially lower than an upper surface of the front section.

8. A dumper vehicle according to claim 7, wherein the dumper vehicle comprises a front axle for mounting the front wheels to the frame, and wherein the front section extends above the front axle.

9. A dumper vehicle according to claim 8, wherein the front section mounts to the front axle at a position substantially above the front axle.

10. A dumper vehicle according to claim 7, wherein the container comprises a lower surface including a substantially flat lowermost portion, wherein the flat lowermost portion is substantially level with the upper surface of the front section.

11. A dumper vehicle according to claim 10, wherein the flat lowermost portion of the container is mounted to the platform.

12. A dumper vehicle according to claim 10, wherein the flat lowermost portion is interposed between the front and rear wheels.

13. A dumper according to claim 10, wherein the lower surface of the container comprises a first substantially linear inclined surface extending upwardly away from the flat lowermost portion towards the front end of the frame.

14. A dumper vehicle according to claim 1, wherein the container is mounted to the platform via a slew ring.

15. A dumper vehicle according to claim 1, wherein the container comprises a front edge, wherein the container further comprises a chute at said front edge.

16. A dumper vehicle according to claim 1, wherein the container defines an internal volume, and a majority of said internal volume is positioned behind a rear extent of the front wheels.

17. A dumper according to claim 1, wherein the center of gravity of the vehicle is maintained rearward of a rear extent of the front wheels.

18. A dumper vehicle according to claim 1, wherein the container defines an upper extent thereof, and wherein said upper extent of the container decreases in height with respect to a lower extent of the wheels towards the front end of the frame, when the container is in the transport position.

19. A dumper vehicle comprising:
   a frame comprising a front end and a rear end;
   front and rear wheels mounted to the frame;
   an operator seat mounted to the frame;
   a lifting assembly mounted to the frame, wherein the lifting assembly comprises a platform; and
   an open topped container for carrying a load therein that is mounted to the platform, wherein the container is moveable about a first axis between a transport position for transporting a load and a discharge position for discharging of a load;
   wherein the lifting assembly is configured for elevating the platform relative to the frame from a first position to a second position, and
   wherein the container is rotatably mounted to the platform so as to be rotatable about a second axis that is substantially perpendicular to the first axis.

20. A dumper vehicle comprising:
   a frame comprising a front end and a rear end;
   front and rear wheels mounted to the frame;
   an operator seat mounted to the frame;
   a lifting assembly mounted to the frame, wherein the lifting assembly comprises a platform; and
   an open topped container for carrying a load therein that is mounted to the platform, wherein the container is moveable between a transport position for transporting a load and a discharge position for discharging of a load;
   wherein the lifting assembly is configured for elevating the platform relative to the frame from a first position to a second position, and
   wherein the container is rotatably mounted to the platform so as to be rotatable about a substantially horizontal plane.

* * * * *